UNITED STATES PATENT OFFICE.

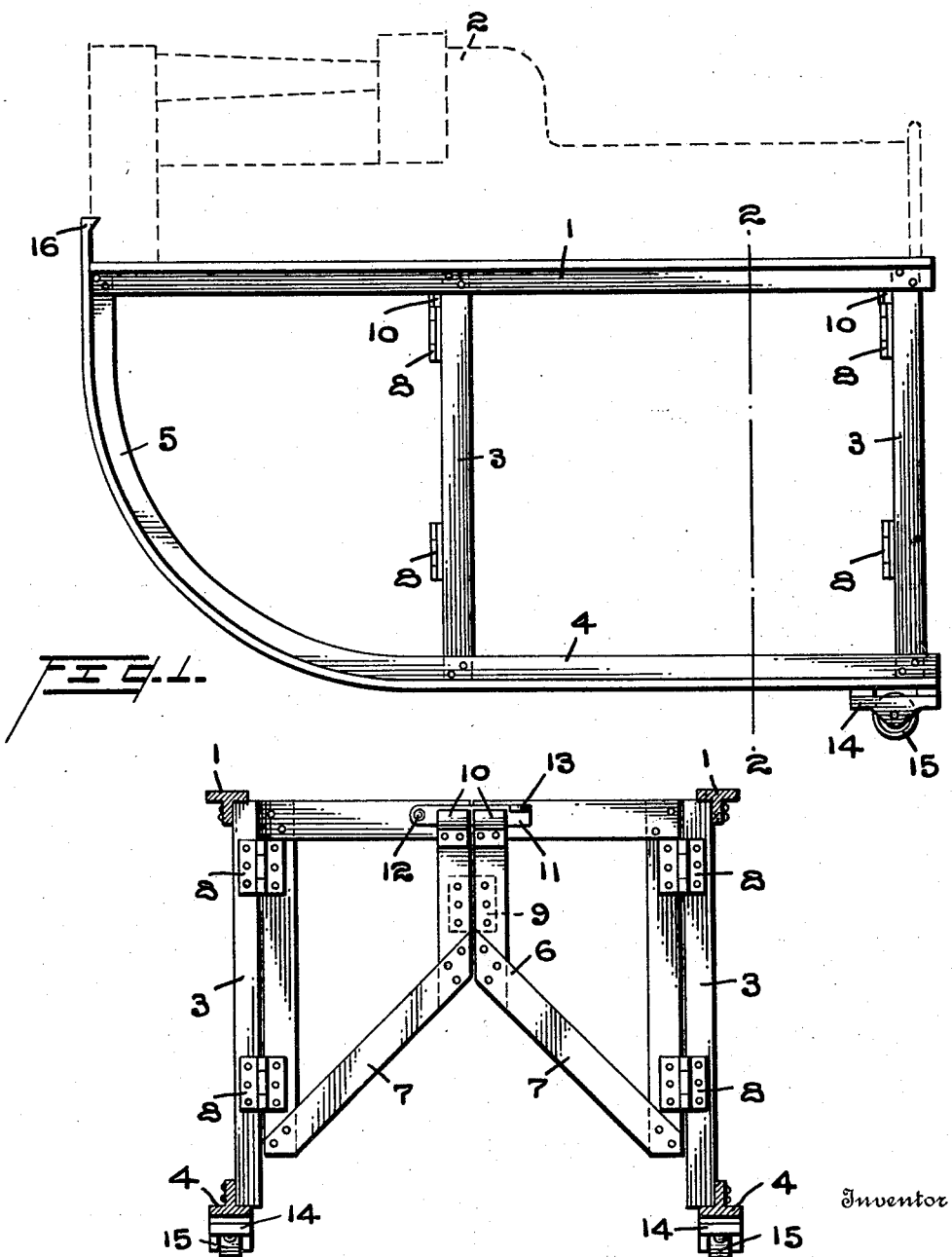

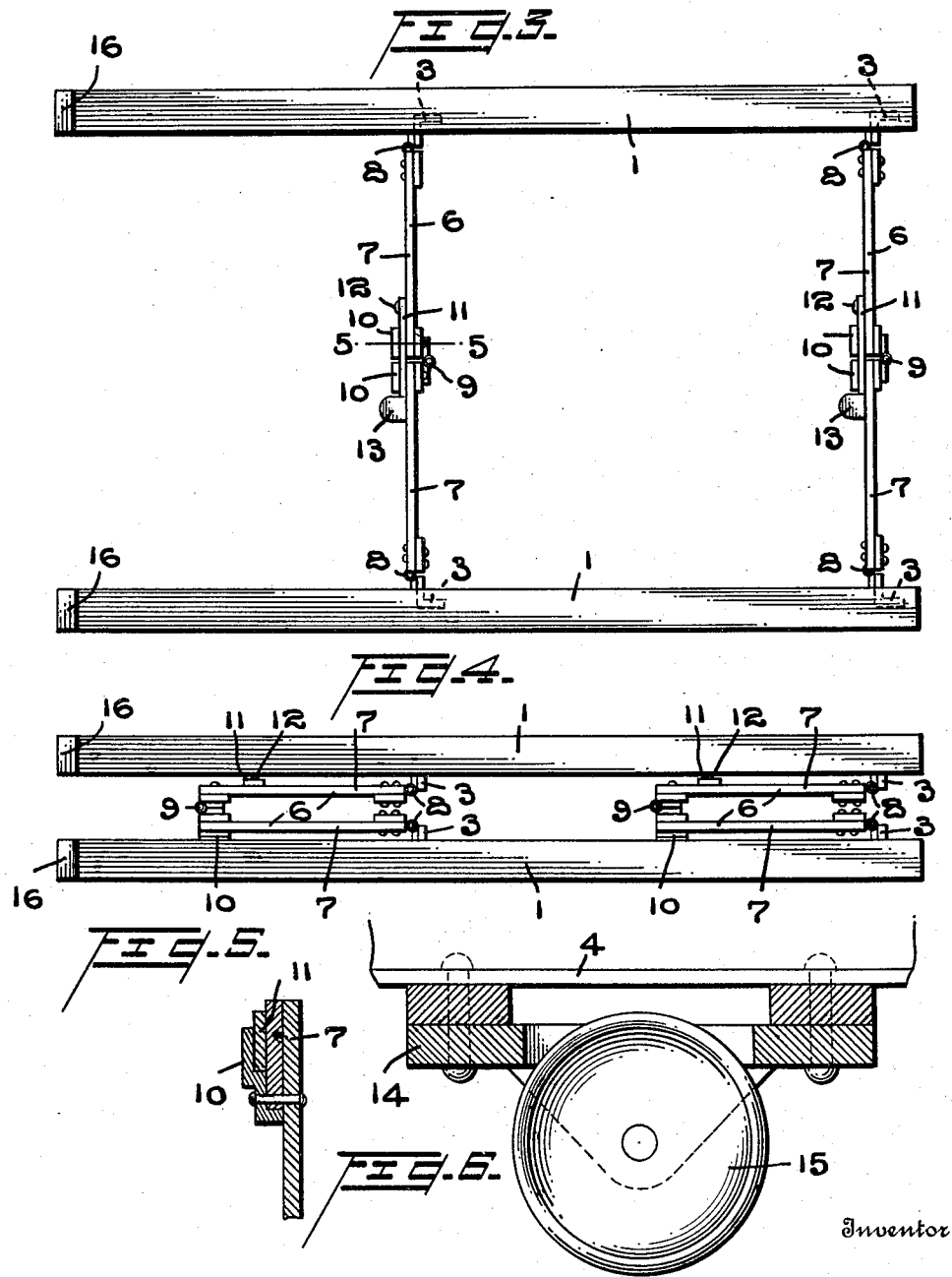

ROBERT A. GUARNIERY, OF PHILADELPHIA, PENNSYLVANIA, ASSIGNOR TO CUNNINGHAM PIANO COMPANY, OF PHILADELPHIA, PENNSYLVANIA.

TRUCK.

1,170,748.      Specification of Letters Patent.      Patented Feb. 8, 1916.

Application filed February 10, 1915. Serial No. 7,311.

*To all whom it may concern:*

Be it known that I, ROBERT A. GUARNIERY, a citizen of the United States, residing at Philadelphia, in the county of Philadelphia and State of Pennsylvania, have invented certain new and useful Improvements in Trucks, of which the following is a specification.

My invention relates to improvements in trucks, and more particularly to trucks designed for use in handling pianos, and especially for use in factories, stores, etc., the object of the invention being to provide a truck of the character stated which can be folded or collapsed and occupy but relatively small space when not in use.

A further object is to provide a truck of the character described which may be manufactured and sold at a reasonably low price, which will be comparatively light to handle, and which will be strong and durable to withstand the use to which it is necessarily subjected.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improved truck in position to support a piano. Fig. 2 is a view in transverse section on the line 2—2 of Fig. 1. Fig. 3 is a top plan view of the truck. Fig. 4 is a top plan view showing the truck folded or collapsed. Fig. 5 is a fragmentary view in section on an enlarged scale on the line 5—5 of Fig. 3, and Fig. 6 is a fragmentary view in longitudinal section illustrating one of the truck wheels and its mounting.

My improved truck comprises two parallel supporting bars 1, 1, which are designed to receive and support a piano 2 or other similar device thereon. The bars 1 are supported at the upper ends of uprights 3, 3, which are secured at their lower ends to lower bars 4. The bars 4 are horizontal throughout the greater portion of their length, but at their forward ends are curved in the arc of a circle as shown at 5 constituting rockers on which the truck can be turned to receive or deposit the piano. These curved ends or runners 5 are secured to the supporting bars 1, and at their extreme ends project above the supporting bars 1 forming lugs 16 to engage under the piano 2, and hold the same while the truck is being rocked or manipulated on its rockers 5.

The bars 1, uprights 3, and bars 4 constitute side frames which are connected by transverse hinged frames 6, 6. These hinged frames 6, 6, each consist of two members 7, 7, which are connected by hinges 8 to the uprights 3 of the side frames, and are also secured together by hinges 9. These frames 7, 7, are preferably composed of flat bars of metal, so that they can be positioned together in so far as permitted by the hinges above referred to, and allow the side frames to be drawn close together to collapse the truck as shown clearly in Fig. 4. The members 7, 7, of the transverse frames 6, are provided with tongues 10, 10, at their upper portions, which tongues are adapted to receive a locking bar 11, and hold the sections 7, 7, against hinged movement. The locking bars 11 are pivotally connected at one end as shown at 12 to one of the transverse frame sections 7, and at their free ends are provided with finger holds 13 to facilitate the manipulation of the locking bars. Slotted brackets 14 are secured to the lower face of the lower bars 4 at their rear ends, and wheels 15 are mounted in said brackets and are adapted to roll over the floor, while the truck is manipulated from the forward or curved end, so that the piano can be readily moved from place to place.

In constructing the parts above described, I preferably form the bars 1 and 4 of T-iron, with the uprights 3 of angle iron, and the several bars forming the transverse hinge frames 6 of flat bars, but it is of course to be understood that my invention is not limited to the particular shape of the bars, although the shape of the bars illustrated is a perferable one.

When the truck is in operative position, the sections 7, 7, of the transverse frames are located in alinement and held in such position by the locking bars 11 as shown clearly in Figs. 2 and 3. When it is desired to fold or collapse the truck, the bars 11 are swung backwardly on their pivots 12, and the transverse frames hinged, so that their sections 7, 7, will be substantially parallel as shown in Fig. 4. This will bring the side frames of the truck close together, and permit the truck to be placed in a relatively small space. It will also be noted that when the truck is collapsed, it can be manipulated with equal efficiency as when extended or in operative position, as the wheels 15 may be rolled over the floor to transport the truck from place to place.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. As a new article of manufacture, a truck comprising side frames, wheels below the side frames, transverse frames connecting the side frames, and said transverse frames consisting each of two sections hinged to the side frames and together, said sections of the transverse frames having tongues thereon, and locking bars pivotally connected to the sections and adapted when positioned in engagement with the tongues to hold the sections of the transverse frames in alinement and maintain the side frames spaced apart, substantially as described.

2. A truck, comprising side frames consisting of upper and lower bars with uprights connecting them, the lower bars curved at one end and secured to the upper bars, with the ends of the curved bars projecting beyond the upper bars, hinged transverse frames connecting the uprights of the side frames, and means for holding the hinged transverse frames against independent movement, substantially as described.

3. A truck comprising a pair of side frames each consisting of an upper and a lower bar and a pair of uprights rigidly connecting said bars, one of said uprights being arranged adjacent one end of the bars and the other intermediate the ends thereof, the lower bar at the other end form said uprights being curved upwardly and secured to the corresponding end of the upper bar, a pair of hinged frames connecting said uprights and each comprising outer vertical bars hingedly attached to said uprights, inner vertical bars hingedly connected to each other, horizontal top bars connecting the outer and inner vertical bars, and upwardly and inwardly inclined lower bars connecting the lower ends of the upright bars and means for locking said frames rigidly in alinement to each other, substantially as described.

In testimony whereof I have signed my name to this specification in the presence of two subscribing witnesses.

ROBERT A. GUARNIERY.

Witnesses:
P. J. CUNNINGHAM,
CHAS. E. POTTS.

Copies of this patent may be obtained for five cents each, by addressing the "Commissioner of Patents, Washington, D. C."